J. Haynes,
Hand Saw.

Nº 31,054.                    Patented Jan. 1, 1861.

Witnesses:
R. W. Ludy
N. P. Levi

Inventor.
James Haynes

UNITED STATES PATENT OFFICE.

JAMES HAYNES, OF HOLLIS, MAINE, ASSIGNOR TO HIMSELF, AND TRISTAM T. LEWIS, OF BOSTON, MASSACHUSETTS.

DEVICE FOR STRAINING WOOD-SAWS.

Specification of Letters Patent No. 31,054, dated January 1, 1861.

*To all whom it may concern:*

Be it known that I, JAMES HAYNES, of Hollis, in the county of York and State of Maine, have made a new and useful Invention Having Reference to Wood-Saws, and do hereby declare the same to be fully described in the following specification and illustrated in the accompanying drawings of which—

Figure 3:
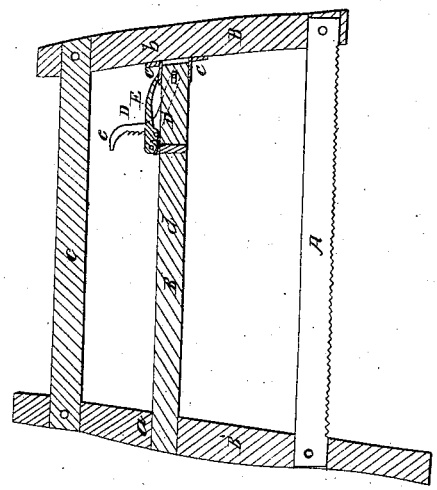
Figure 2:
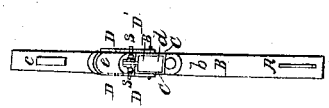
Figure 1:
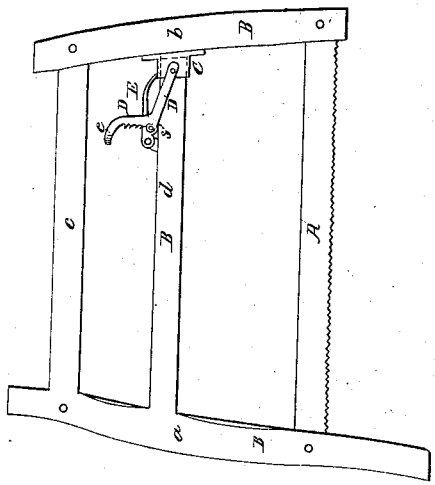

Figure 1, is a side elevation, and Fig. 2, a transverse section of a wood saw as provided with my invention. Fig. 3, is a vertical and longitudinal section of the same.

On the 9th day of August, A. D. 1859, Letters Patent of the United States of America were granted to me on an improvement in the wood saw, the said improvement consisting in an inclined plane ratchet and nipper or strainer applied to the saw blade and its frame and for the purpose of enabling the saw to be strained the nipper or strainer being jointed to the saw blade, while the rest of the mechanism was applied directly to the front end bar of the frame. To the arrangement of these appliances relatively to the saw blade and its frame, objection is sometimes made, for as the nipper or strainer is jointed directly to the blade, the latter is not only required to project some distance beyond the front edge of the front end bar of the frame, but has to be made with a hole to receive the joint pin of the nipper. Furthermore, the extension of the nipper or strainer and its rack and inclined plane beyond the said front bar, renders them, at times, likely to be either injured or deranged, or makes it inconvenient to use the saw.

In carrying out my present invention I employ an arm, a rack and a lever and arrange them within the saw frame and either on one or both sides of it and in connection with the lower cross bar and the front end bar thereof. Thus, I do not apply either of the straining devices directly to the saw blade, and therefore am able to so arrange the saw blade that it shall not project beyond the front side of the front bar of the frame.

I also attain by my invention, other important advantages.

In the drawings, A, exhibits the saw and B, its frame, the latter being composed of the handle and front bars, $a$, $b$, and the upper and lower cross bars, $c$, $d$. The bar $d$, instead of being secured to the bar, $b$, by a pin in the usual manner extends into a metallic socket or shoe, C, affixed to the inner side of the said bar, $b$. To the said part, C, or to each side thereof, an arm, D′, is jointed and has a rack D extending upward from it as shown in Fig. 1. The two racks of the two arms are connected at their upper ends by an arched extension or bar, $c$. A straining lever E, is jointed at one end to the bar, $d$, passes forward between the two racks and is provided with two studs, $s$, $s$, to play respectively into them. By forcing the said lever downward, each rack and its toggle will be simultaneously depressed and will cause the front bar, $b$, to be so forced forward as to strain the saw.

It will be evident that but a single arm and rack instead of two racks and two arms may be used with the straining lever, but I prefer to employ one arm and a rack on each side of the lower cross bar. Instead of being jointed to the shoe or socket piece, C, the arm or arms may be jointed directly to the bar, $b$. For good reason, however I conceive it better to connect such arm or arms to the said part C.

Instead of being applied to the bar, $b$, the arm and rack may be jointed to the handle bar $a$, in which case the bar, $d$, should be attached to the bar, $b$, and be movable with respect to the handle bar, the lever, E, being arranged near to the latter.

By arranging the arm, D′, the rack D, and the lever, $b$, entirely within the saw frame and with reference to the lower cross bar, $d$, and either of the end bars, $a$, $b$, as set forth, such saw straining devices are protected either from injury or accidental displacement, and besides, they are disposed where there is no inconvenient projection of them beyond the outer edges of the frame.

I do not herein claim the combination of an inclined plane ratchet and nipper or straining lever as set forth in the specification of my aforesaid patent; nor do I claim an arrangement wherein the inclined plane and rack are directly applied to the end bar of the frame while the nipper lever or strainer is jointed to the saw blade.

I claim—

The above described peculiar arrangement of the arm, D', the rack, D, and the lever, E, together and within the saw frame and with respect to the lower cross bar, d, and either of the end bars, a, b, as specified.

JAMES HAYNES.

Witnesses:
R. H. EDDY,
W. G. LEIR.